April 30, 1940.  E. S. S. WOHLFAHRT  2,198,797

VALVE SYSTEM FOR REGENERATIVELY HEATED FURNACES AND THE LIKE

Filed March 7, 1939

Inventor
Edvard Sixten Sylvenson Wohlfart
By  J. Friedmann
Attorney

Patented Apr. 30, 1940

2,198,797

UNITED STATES PATENT OFFICE 2,198,797

VALVE SYSTEM FOR REGENERATIVELY HEATED FURNACES AND THE LIKE

Edvard Sixten Sixtensson Wohlfahrt, Domnarvet, Sweden, assignor to Ingenieurbüro für Huttenbau Wilhelm Schwier, Dusseldorf, Germany Application March 7, 1939, Serial No. 260,259
In Sweden March 18, 1938

3 Claims. (Cl. 158—7.5)

This invention relates to an improved arrangement of valves and ducts in furnaces and the like which require reversing valves, as used, for instance, in connection with regeneratively heated open-hearth furnaces.

Reversing valves for regeneratively heated furnaces and the like must comply with the following requirements:

(a) The reversion of the direction of the gas must be effected without any loss of gas, that is to say, in such a manner that no communication between the gas duct and the chimney can take place.

(b) The valves should be tight so that no gas can get lost.

(c) The valves should operate with the least possible loss of draught. In this respect slide-valves are most ideal.

(d) The reversions must take place without any risk of an explosion.

(e) The distribution of the gas into the individual chambers, as well as the total furnace draught, should be regulated solely by the reversing valves without any additional valves.

(f) The valve system should be reliable in service and the costs of its erection and the operating costs should be low.

The most ideal reversing valve arrangement in regard to service considerations is that in which disk valves are provided in the gas ducts and the air ducts, and slide-valves are provided in the chimney ducts, and in which the valves are controlled positively in pairs in such a manner that valves pertaining to the same group cannot simultaneously be open and losses of gas due to the reversing of the valves are, therefore, prevented. As the slide-valves in the smoke ducts of the gas chambers are never perfectly tight owing to the formation of pitch, water-cooled cup-valves have generally been substituted for said valves, whereby, however, a loss of draught is caused owing to the change of direction of the waste gas, and also a reduction of the temperature thereof takes place. Besides, the substitution of cup-valves for slide-valves entails an increase of the erection costs of the plant and of the space it occupies.

This invention opens a practical and cheap method of preventing any loss of gas in the gas slide-valves without losing any of the advantages which the slide-valves present over other types of valves.

Figure 1:
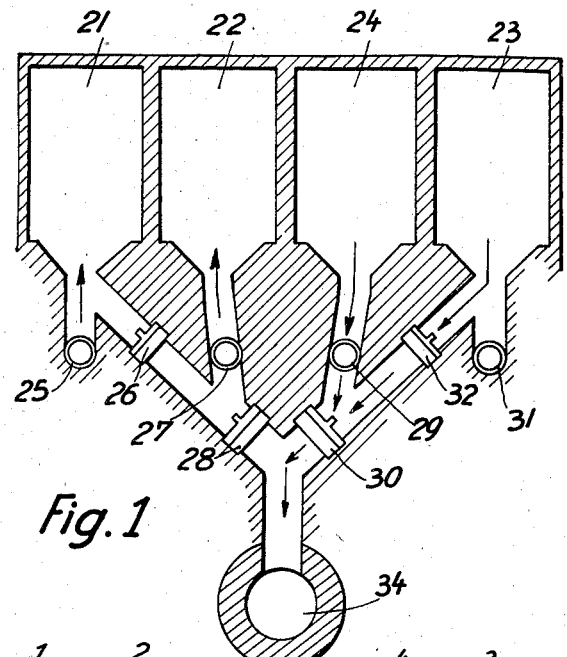
Figure 2:
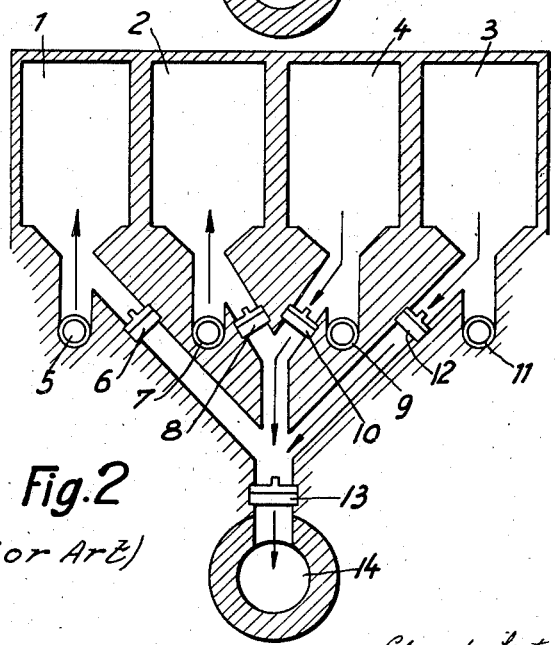

The invention is illustrated diagrammatically and by way of example on the accompanying drawing in which Figure 1 is a horizontal section through the arrangement of the chambers, ducts and valves of an open-hearth furnace designed according to this invention, and in order to make matters more clear, and for the sake of comparison, I have added Figure 2 which is a horizontal section through the chambers, the ducts and the valves as arranged up to now.

In both figures the combustion gases are conducted alternately through the disk valves 5 and 11, or 25 and 31 respectively, to the gas chambers 1 and 3, or 21 and 23 respectively.

The air is conducted simultaneously through the valves 7 and 9, or 27 and 29 respectively, to the air chambers 2 and 4, or 22 or 24 respectively. Within the ducts between the gas chambers and the air chambers on the one side and the chimney 14, or 34 respectively on the other side, are located the slide-valves 6, 8, 10, 12, and 13, or 26, 28, 30 and 32 respectively.

With valves arranged as hitherto (Fig. 2) the position of the valves between two reversing operations, and if the gas and the air are supplied from the left (as indicated by the arrow), is as follows: The valves 5 and 7 are open and the slide valves 6 and 8 are closed, in consequence whereof the gas flows into the gas chamber 1 and the air flows into the air chamber 2. On the right-hand side of the furnace the valves 9 and 11 are closed and the slide-valves 10 and 12 are opened, which prevents access of the gas and the air, and the waste gases escape from the furnace through the gas chamber 3, or the air chamber 4 respectively, to the chimney 14 through the slide-valve 13, which is opened just as much as required for the regulation of the entire draught of the furnace. After the valves and the slide-valves have been reversed for heating the furnace from the right-hand side the position of said members is completely the opposite of what it had been prior to the reversing, apart from the slide-valve 13 which remains either fully in its former position or its position is varied only so much as just required for the regulation of the total draught of the furnace. The slide-valves 6 and 12 on the furnace side are in contact with the gas, in consequence whereof they and their seats are easily covered with soot and their tightness is thereby gradually decreased. As the gas is subjected to a certain definite pressure over atmospheric, and the slide valve is subjected on the chimney-side to a certain pressure substantially below atmospheric, owing to the draught in the chimney, the loss of gas is considerable even if the slide-valves are only slightly untight. This cannot take place with the improved arrangement constituting the present invention and being illustrated in Fig. 1.

The valves 25 and 31 and the slide-valves 26 and 32 in the supply ducts and the exit ducts pertaining to the gas-chambers 21 and 23 are arranged in precisely the same manner as in the old system (Fig. 2). The disk valves 27 and 29 for the supply of the combustion air to the air chambers 22 and 24 are provided in the arch of the exit ducts, as in Fig. 1, or they are provided in separate lateral ducts, as in Fig. 2. The difference between these two arrangements consists chiefly in the provision of the slide-valves in the ducts connecting the air chambers with the chimney the slide being housed, as in Fig. 1, in the ducts common to the gas chamber and the air-chamber on the left-hand side, or the right-hand side respectively, of the furnace, these ducts being either united with one another to one duct terminating in the chimney, or each of them terminating separately in the chimney, as preferred.

In case the furnace is heated from the left hand side, the position of the valves between two reversing operations is as follows: The valves 25 and 27 are open and the slide-valves 26 and 28 are closed, and accordingly, the gas flows into the gas chamber 21 and the air flows into the air-chamber 22, as indicated by the arrows. On the exit side of the furnace the valves 29 and 31 are closed and the slide-valves 30 and 32 are open, and, accordingly, the gas and the air are prevented from getting access to the furnace, and the waste gases pass freely from the gas chamber 23 and the air chamber 24 into the chimney 34. As the gas and the air are supplied into the chambers on the entrance side thereof and their pressure is the same or approximately the same, generally only a few millimeters above or below atmospheric pressure, the just-described improved arrangement of the valves presents obviously a remarkable advantage.

In case the furnace is heated from the left hand side, that is to say, if the slide-valves 26 and 28 on the left-hand side of the furnace are closed, the air obtained in this way has approximately the same pressure as has the gas present on the outer side of the slide-valve 26, i. e. the air does not have the pressure existing in the chimney, viz. a pressure considerably below atmospheric which amounts, as a rule, to about 60 mm. watercolumn or more. There does not arise, therefore, any loss of gas on the way to the chimney, even if the slide-valve should not be completely tight. If the slide 26, or 32 respectively, is untight and a certain difference of pressure between the supplied gas and the supplied air has arisen, it may occur that a certain flow of gas or air through the slide-valve 26, or 32 respectively, takes place, but that flow will be without any importance, as larger differences of pressure cannot arise and the amount of heat produced by the formation of a gas-flame on the one or the other side of the slide 26, or 32 respectively, is reconducted to the furnace.

The arrangement of the valves in accordance with this invention renders possible a completely individual regulation of the furnace draught in the several chambers, although no slide-valve between the air-chamber and the common duct with the air chamber arranged on the same side is provided, in that the gas chambers will always have a certain higher temperature and it, therefore, suffices to effect this by throttling their exit ducts by means of the slide-valves 26 and 32.

The invention entails also the following other advantage: As the slide-valves 28 and 30 are located in the duct common to the gas chamber and to the air chamber of the respective side of the furnace, the total furnace draught can be regulated with the aid of these valves, so that no additional slide-valve in the chimney duct common to the entire furnace is required, as is, however, the case in the known arrangement. (Fig. 2.)

When reversing the direction of the gas from heating the left-hand side of the furnace to heating the right hand side of the same, one proceeds preferably as follows: The air-valve 27 is closed and the slide-valve 28 is opened immediately thereafter, whereas simultaneously therewith the slide-valve 32 is closed and the valve 31 is opened. The hot air escapes now into the chimney from the air chamber 22 and the gas passes into the gas chamber 23 where it encounters waste gas so that no explosion need be feared. The reversing can be effected, therefore, without any risk of an explosion. In the next moment of the reversing procedure the valve 25 is closed and instantly thereafter the slide-valve 26 is opened, whereas at the same time the valve 29 is opened and the slide-valve 30 is closed immediately thereafter. The gas escaping from the gas chamber 21 encounters in the duct containing the slide-valve strongly heated air coming from the air chamber 22 so that the gas will be ignited without any risk of an explosion, also another succession in the operation of the valves and slide-valves, which may be effected simultaneously with reversing of the same, is, of course, possible.

The draught distribution between the gas-chambers and the air-chambers is regulated by means of the slide-valves 26, or 32 respectively, and the total furnace draught is regulated by means of the slide-valve 28, or 30 respectively.

The valves and the slide-valves may be of any desired construction suitable for the purpose in view.

I claim:

1. A valve system for regenerative furnace systems and the like comprising a plurality of gas chambers and air chambers, a chimney, gas ducts connecting each of said gas chambers with said chimney, air ducts connecting each of said air chambers with said chimney, a valve in each of said gas ducts, one of said air ducts meeting one of said gas ducts between said valve and said chimney, another valve arranged between said junction of one of said gas ducts with one of said air ducts and said chimney, whereby the pressure of the air in said air duct is balanced by the pressure of the gas on the other side of said first mentioned valve in order to prevent losses of gas.

2. A valve system as claimed in claim 1 wherein said valve arranged between said junction of one of said gas ducts with one of said air ducts and said chimney is a slide-valve.

3. A valve system for regenerative furnace systems and the like comprising left and right hand gas chambers, left and right hand air chambers, a chimney, left and right hand gas ducts, left and right hand air ducts, each of said gas ducts being provided with a valve, said left hand air duct meeting said left hand gas duct between said left hand gas duct valve and said chimney, thus forming a left hand chimney duct, said right hand air duct meeting said right hand gas duct between said right hand gas duct valve and said chimney thus forming a right hand chimney duct, another valve arranged between said left hand junction of said air duct and said gas duct and said chimney, still another valve arranged between said right hand junction of said air duct and said gas duct and said chimney, whereby the pressure of the air in said air duct is balanced by the pressure of the gas on the other side of said first mentioned valve in order to prevent losses of gas, each of said chimney ducts being separately connected with said chimney.

EDVARD SIXTEN
SIXTENSSON WOHLFAHRT.